V. H. TODD.
INDICATING CYCLE METER.
APPLICATION FILED OCT. 6, 1914.
1,234,970.
Patented July 31, 1917.
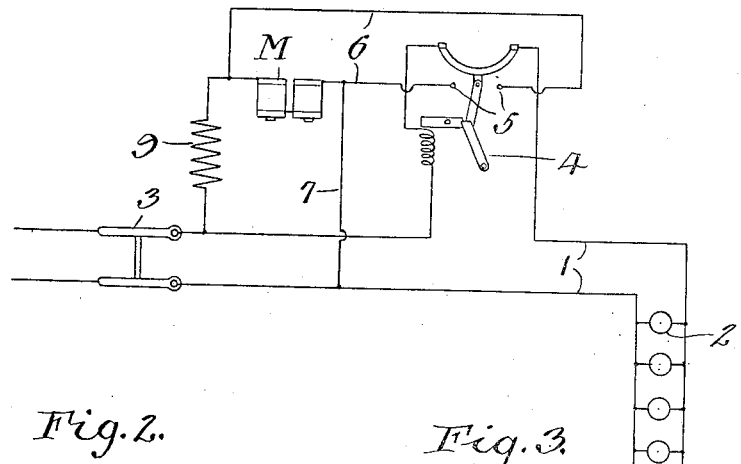
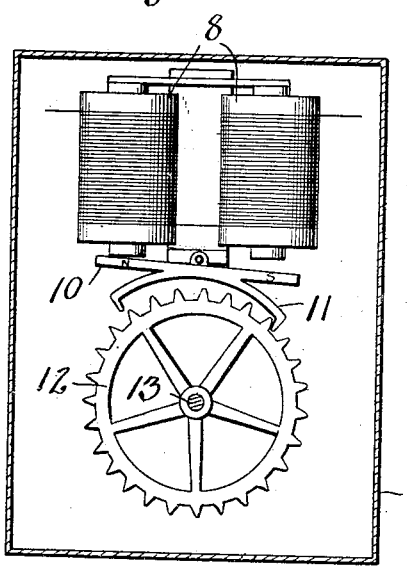
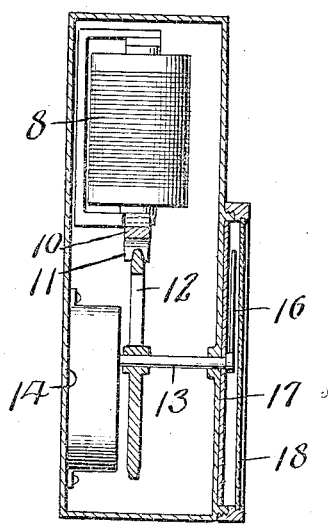
Witnesses
Inventor
V. H. Todd,
By Victor J. Evans
Attorney

UNITED STATES PATENT OFFICE.

VICTOR H. TODD, OF ORANGE, NEW JERSEY, ASSIGNOR TO WESTINGHOUSE ELECTRIC & MANUFACTURING COMPANY, A CORPORATION OF PENNSYLVANIA.

INDICATING CYCLE-METER.

1,234,970.   Specification of Letters Patent.   Patented July 31, 1917.

Application filed October 6, 1914. Serial No. 865,369.

*To all whom it may concern:*

Be it known that I, VICTOR H. TODD, a citizen of the United States, residing at Orange, in the county of Essex and State of New Jersey, have invented new and useful Improvements in Indicating Cycle-Meters, of which the following is a specification.

This invention relates to a cycle indicating meter, and has for its primary object the provision of a meter of this character wherein a pair of magnets oscillates an armature that releases an escapement wheel which transmits its motion to the hand for indicating the number of cycles of an alternating current that has passed in a certain period.

Another object of the invention is the provision of a structure of this character whereby a number of cycles of an alternating current which elapse during a certain length of time, such as the time between the moment of increase in voltage and the opening of the circuit breaker, may be indicated.

A still further object of the invention is the provision of a meter so arranged in the load circuit with relation to the circuit breaker that the sensitiveness of the latter can be determined.

The invention consists in the features of construction, combination, and arrangement of parts, hereinafter fully described and claimed, reference being had to the accompanying drawings, in which:

Figure 1 is a diagrammatic view of a load circuit and the position of the meter with respect to said circuit breaker.

Fig. 2 is a section through the casing of the meter showing the relative position of the mechanism.

Fig. 3 is a section therethrough.

Referring to the drawing, the numeral 1 designates a load circuit shown feeding a series of lamps 2, said circuit being closed through the two blade switch 3. Connected in series in the load circuit is a conventional form of circuit breaker having an extra set of contacts 5 which form the terminals for a partial circuit 6. A circuit 7 connects my improved meter M in parallel with the load circuit, the free terminals of the partial circuit 6 being connected to the circuit 7 on opposite sides of the meter. My improved meter for measuring the cycles in an alternating current comprises a pair of electro-magnets 8 which are connected in series with the circuit 7, the current through which, being controlled by a resistant coil 9. Spaced from the poles of the magnet is a permanent magnet 10 that is rigidly connected to a detent 11 which controls the movement of an escapement wheel 12 mounted upon a shaft 13. One end of the shaft 13 passes through the meter casing 14 and has connected thereon a pointer 16 that oscillates over a calibrated disk 17, visible from the front through a glass plate 18.

In operation, the meter is connected up in parallel with the load circuit as shown in the diagrammatic view so that when an increase in voltage occurs, the current forces its way through the resistant coil in the electro-magnet with the result that the electro-magnets are energized to alternately present a north and south pole opposite the permanent magnet, this action causing the bar magnet to oscillate to allow the detent to release the escapement wheel to move one tooth at a time, the pointer over the disk indicating the number of times the bar magnet has oscillated. As soon as the strength of the coils in the circuit breaker has built up to its maximum strength, it closes the contact 5 simultaneously upon opening the load circuit, the closing of the contact 5 causing a short circuit of the current around the electro-magnet 8 with the effect of stopping instantly the pointer over a division on the disk which indicates the number of cycles that have elapsed between the overload and the breaking of the circuit through the circuit breaker; thus the sensitiveness of the circuit breaker is determined.

From the foregoing description, taken in connection with the accompanying drawing, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim is:

1. In combination, a main circuit, an indicator bridged across the circuit and adapted for operation upon an increase in voltage in the circuit, a circuit breaker arranged in the circuit and means controlled by the circuit breaker for interrupting the operation of the indicator upon the action of the circuit breaker.

2. An indicator arranged in a circuit and operable upon an increase in voltage beyond a predetermined point, in said circuit, and means for automatically breaking the circuit upon a predetermined increase in current, said means being operable to cut out the indicator.

3. A circuit breaker, means for indicating the responsiveness thereof, including an indicator set in operation by an increase in current voltage, and cut out of operation by the circuit breaker immediately following the opening circuit movement thereof.

In testimony whereof I affix my signature in presence of two witnesses.

VICTOR H. TODD.

Witnesses:
  EMILY A. TODD,
  CLARA REINMAN.